(12) United States Patent
Shirasawa

(10) Patent No.: US 6,948,855 B2
(45) Date of Patent: Sep. 27, 2005

(54) MULTI-STAGE CROSS ROLLER BEARING

(75) Inventor: Naomi Shirasawa, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/432,403

(22) PCT Filed: Dec. 4, 2002

(86) PCT No.: PCT/JP02/12727

§ 371 (c)(1),
(2), (4) Date: Jun. 23, 2003

(87) PCT Pub. No.: WO03/050428

PCT Pub. Date: Jun. 19, 2003

(65) Prior Publication Data

US 2004/0081379 A1 Apr. 29, 2004

(30) Foreign Application Priority Data

Dec. 11, 2001 (JP) ........................................ 2001-376690

(51) Int. Cl.[7] .............................................. F16C 19/28
(52) U.S. Cl. ....................................................... 384/447
(58) Field of Search ................................ 384/447, 461, 384/505, 506, 619

(56) References Cited

U.S. PATENT DOCUMENTS 4,789,254 A   12/1988   Marquardt et al.

FOREIGN PATENT DOCUMENTS

JP   05-044720   2/1993
JP   2000-027857  1/2000

Primary Examiner—Lenard A. Footland
(74) Attorney, Agent, or Firm—Darby & Darby

(57) ABSTRACT

A two-stage cross roller bearing (1) includes a first cross roller bearing (10) and a second cross roller bearing (20) that are disposed concentrically along a plane that is perpendicular to the bearing axis 1a. The inner ring of the first cross roller bearing (10) and the outer ring of the second cross roller bearing (20) are formed of a single ring-shaped member (14), with an inner ring-side raceway groove (13) of the first cross roller bearing being formed on the circular outer circumferential surface of the ring-shaped member and an outer ring-side raceway groove (21) of the second cross roller bearing being formed on the circular inner circumferential surface of the ring-shaped member. A small, compact, and flat multistage cross roller bearing is realized.

4 Claims, 4 Drawing Sheets

MULTI-STAGE CROSS ROLLER BEARING

TECHNICAL FIELD

The present invention relates to a small, compact multistage cross roller bearing.

RELATED ART

A cross roller bearing is constituted so that rollers are inserted into a ring-shaped raceway formed between an outer ring and an inner ring in a manner that the rotational axes of alternating rollers are perpendicular. Accordingly, cross roller bearings are often used for bearings that are subjected to both a radial load and a thrust load.

DISCLOSURE OF THE INVENTION

It is an object of the present invention to provide a multistage cross roller bearing that includes a plurality of cross roller bearings and has a small, compact construction.

In particular, it is an object of the present invention to provide a flat multistage cross roller bearing.

In order to achieve the above and other objects, a multistage cross roller bearing according to the present invention including a first cross roller bearing and a second cross roller bearing, wherein the second cross roller bearing is disposed inside and concentrically with the first cross roller bearing, an inner ring of the first cross roller bearing and an outer ring of the second cross roller bearing are formed of a single ring-shaped member, and an inner ring-side raceway groove of the first cross roller bearing is formed in a circular outer circumferential surface of the ring-shaped member and an outer ring-side raceway groove of the second cross roller bearing is formed in a circular inner circumferential surface of the ring-shaped member.

The multistage cross roller bearing of the present invention has a first cross roller bearing and a second cross roller bearing disposed concentrically, with the inner ring of the first cross roller bearing and the outer ring of the second cross roller bearing being formed of a single ring-shaped member. Accordingly, by arranging the first cross roller bearing and the second cross roller bearing on a plane that is perpendicular to the axes of these bearings, an extremely slimline cross roller bearing can be realized. Therefore if the multistage cross roller bearing of the present invention is used, it is possible to realize an extremely slimline bearing structure that is capable of high support rigidity and from which two types of concentric rotation can be obtained.

In order to produce a three-stage cross roller bearing according to the present invention, the multistage cross roller bearing may further include a third cross roller bearing that is disposed inside and concentrically with the second cross roller bearing, wherein an inner ring of the second cross roller bearing and an outer ring of the third cross roller bearing may be formed of a single second ring-shaped member, and an inner ring-side raceway groove of the second cross roller bearing may be formed in a circular outer circumferential surface of the second ring-shaped member and an outer ring-side raceway groove of the third cross roller bearing may be formed in a circular inner circumferential surface of the second ring-shaped member.

In this way, the present invention provides a simple construction for a multistage cross roller bearing with three or more stages.

In another aspect of the present invention, there is provided a multistage cross roller bearing which includes a first cross roller bearing and a second cross roller bearing, wherein the first cross roller bearing and the second cross roller bearing are disposed concentrically and in parallel in a direction of bearing axes of the first cross roller bearing and the second cross roller bearing, outer rings of the first cross roller bearing and the second cross roller bearing are formed of a single ring-shaped member, and an outer ring-side raceway groove of the first cross roller bearing and an outer ring-side raceway groove of the second cross roller bearing are formed in a circular inner circumferential surface of the ring-shaped member.

A multistage cross roller bearing of the above construction can also be made small and compact. This construction is especially suitable for a multistage cross roller bearing with a central hollow where the inner ring made of a ring-shaped member.

Instead of forming the outer rings of the first cross roller bearing and the second cross roller bearing as a single ring-shaped member, the inner rings of these cross roller bearings may be formed as a single ring-shaped member.

That is to say, the inner rings of the first cross roller bearing and the second cross roller bearing may be formed of a single ring-shaped member and an inner ring-side raceway groove of the first cross roller bearing and an inner ring-side raceway groove of the second cross roller bearing may be formed in a circular outer circumferential surface of the ring-shaped member.

BEST MODE FOR CARRYING OUT THE PRESENT INVENTION

With reference to the attached drawings, there will be described embodiments of a multistage cross roller bearing according to the present invention.

First Embodiment

Figure 1A:
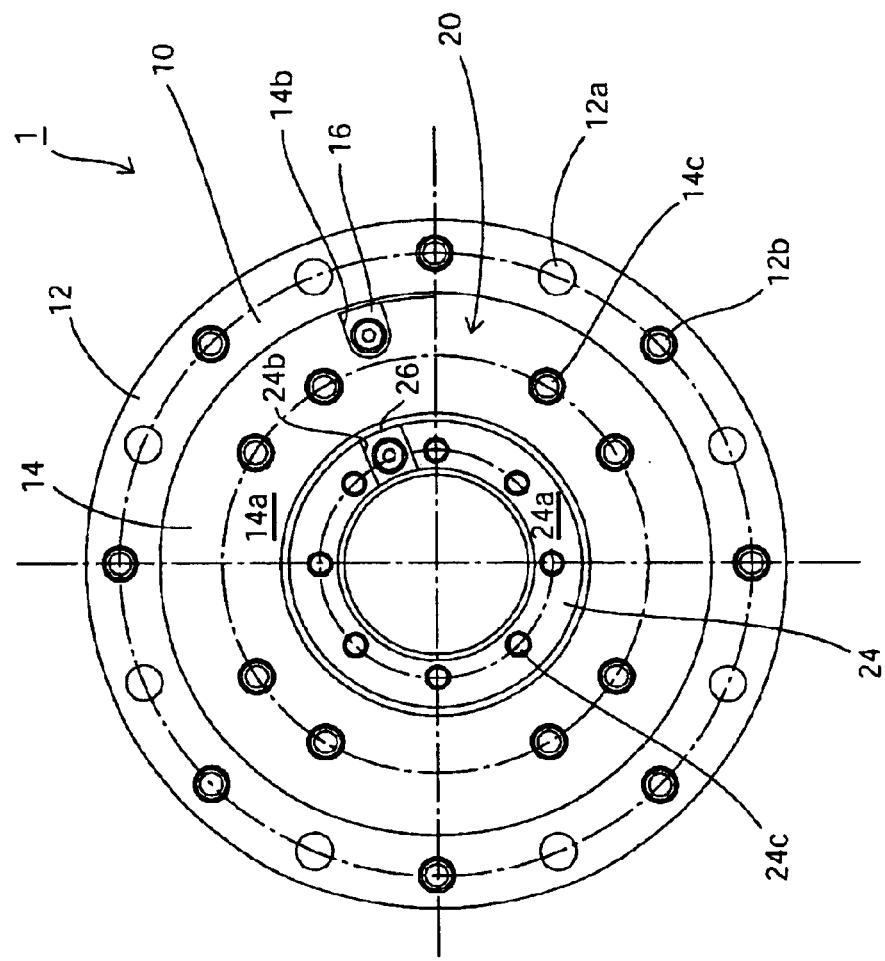
FIGS. 1A and 1B are an end view and a cross-sectional view showing a two-stage cross roller bearing according to a first embodiment of the present invention.
Figure 1B:
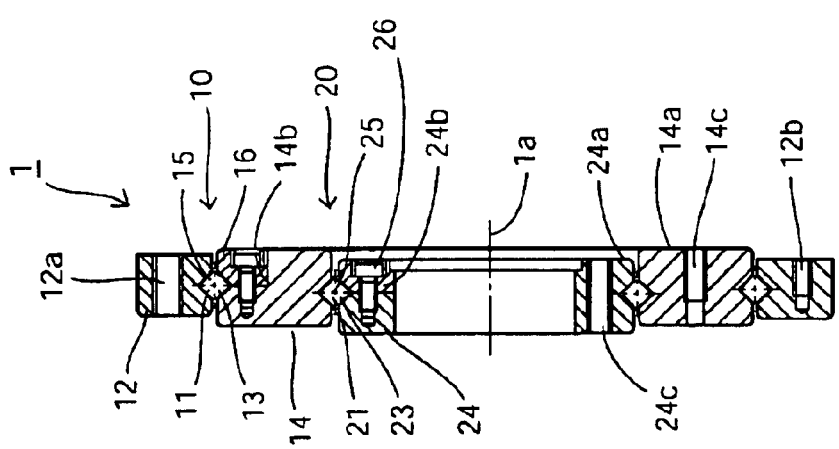

FIGS. 1A and 1B are an end view and a cross-sectional view showing a two-stage cross roller bearing according to a first embodiment of the present invention. As shown in these drawings, a two-stage cross roller bearing 1 of this embodiment includes a first cross roller bearing 10 and a second cross roller bearing 20. The second cross roller bearing 20 is disposed concentrically on the inside of the first cross roller bearing 10. In this embodiment, the first and second cross roller bearings 10, 20 are disposed on a plane that is perpendicular to a bearing axis 1a.

The first cross roller bearing 10 includes an outer ring 12 that has a ring-shaped outer ring-side raceway groove 11 formed in a circular inner circumferential surface, a first ring-shaped member 14 that has a ring-shaped inner ring-side raceway groove 13 formed in a circular outer circumferential surface, and a plurality of rollers 15 that are inserted into a raceway formed by the outer ring-side raceway groove 11 and the inner ring-side raceway groove 13 so that the rotational axes of alternating rollers are perpendicular to one another. An insertion hole 14b that allows the rollers 15 to be inserted into the raceway is formed in a ring-shaped end surface 14a of the first ring-shaped member 14, with this insertion hole 14b being plugged by a plug 16.

At intervals of a certain angle, attachment holes 12a and threaded holes 12b are alternately formed in the circumferential direction around the outer ring 12, with these holes extending in the direction of the bearing axis 1a. A plurality of threaded holes 14c are also formed at certain intervals in the circumferential direction in the first ring-shaped member 14, with these threaded holes 14c also extending in the direction of the bearing axis 1a.

On the other hand, the second cross roller bearing 20 includes an outer ring-side raceway groove 21 that is formed in a circular inner circumferential surface of the first ring-shaped member 14 mentioned above, a ring-shaped inner ring 24 that has an inner ring-side raceway groove 23 formed in a circular outer circumferential surface, and a plurality of rollers 25 that are inserted into a raceway formed by the outer ring-side raceway groove 21 and the inner ring-side raceway groove 23 so that the rotational axes of alternating rollers are perpendicular to one another. An insertion hole 24b that allows the rollers 25 to be inserted into the raceway is formed in a ring-shaped end surface 24a of the ring-shaped inner ring 24, with this insertion hole 24b being plugged by a plug 26. Also, a plurality of threaded holes 24c are formed around the inner ring 24 in a circumferential direction at intervals of a fixed angle, with these threaded holes 24c passing through the inner ring 24 in the direction of the bearing axis 1a.

With the two-stage cross roller bearing 1 of the above construction, two types of concentric rotation can be obtained from a single plane that is perpendicular to the bearing axis 1a.

Second Embodiment

Figure 2:
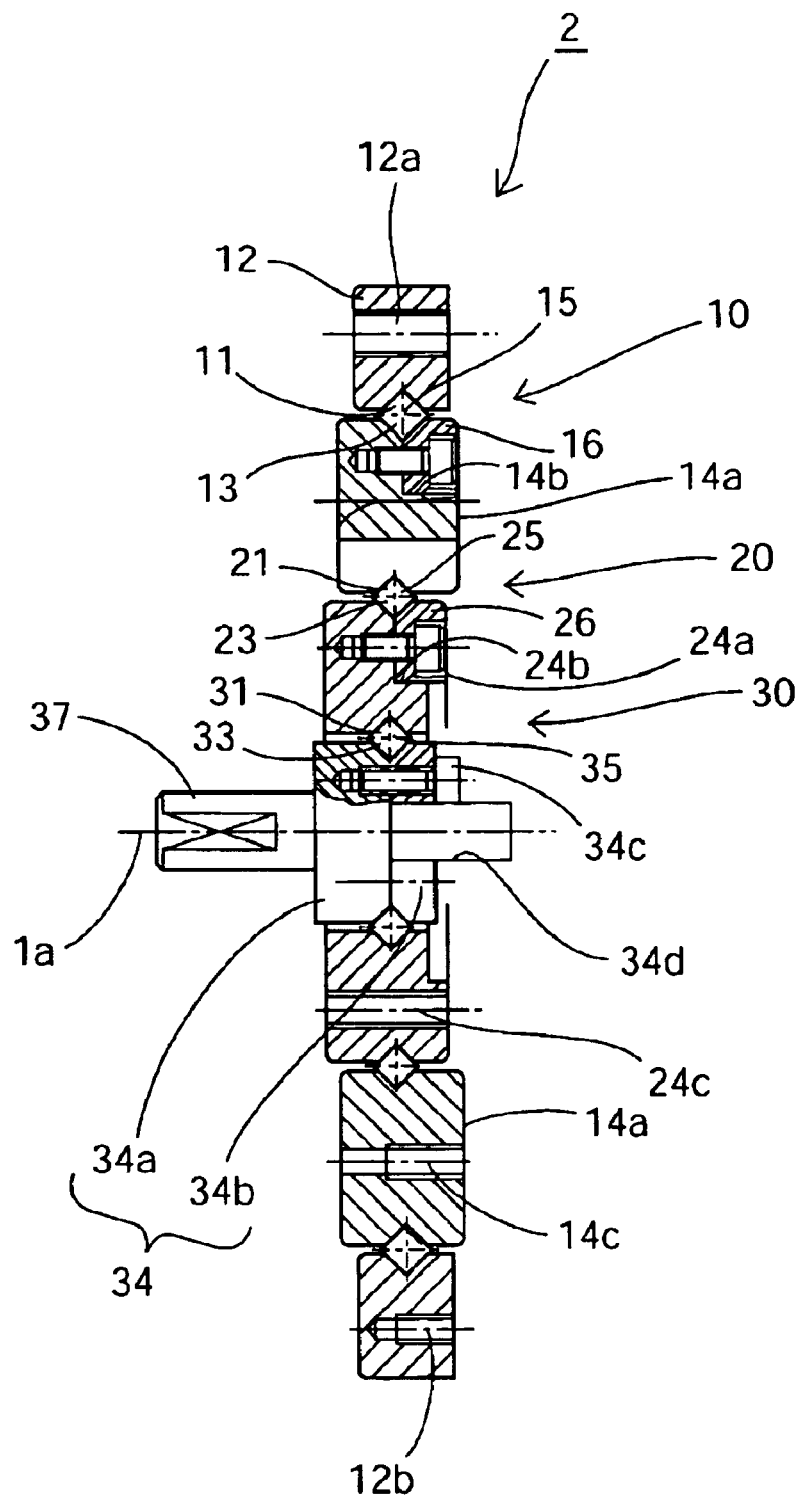
FIG. 2 is a cross-sectional view showing a three-stage cross roller bearing according to a second embodiment of the present invention.

FIG. 2 is a cross-sectional view showing a three-stage cross roller bearing according to a second embodiment of the present invention. The three-stage cross roller bearing 2 of the present embodiment is further constructed with a third cross roller bearing 30 that is disposed concentrically on the inside of the two-stage cross roller bearing 1 described above. Since the basic constructions of the first and second cross roller bearings 10, 20 are the same as in the first embodiment, corresponding parts are denoted by the same reference numerals and will not be described.

In the three-stage cross roller bearing 2 of the present embodiment, the third cross roller bearing 30 disposed on the very inside uses the ring-shaped inner ring 24 (the second ring-shaped member) of the second cross roller bearing 20 as its outer ring. In other words, an outer ring-side raceway groove 31 for the third cross roller bearing is formed in a circular inner circumferential surface of the inner ring 24. An inner ring 34 integrally formed with a rotational shaft 37 is disposed inside the inner ring 24, and an inner ring-side raceway groove 33 is formed in the circular outer circumferential surface of the inner ring 34. A plurality of rollers 35 are inserted into the ring-shaped raceway formed by the outer ring-side raceway groove 31 and the inner ring-side raceway groove 33 so that the rotational axes of alternating rollers are perpendicular to one another.

The inner ring 34 of the present embodiment is a divided ring, and is composed of a first divided ring part 34a and a second divided ring part 34b that are fastened together in the direction of the bearing axis 1a by a fastening belt 34c. The rotational shaft 37 is integrally formed with one of the divided ring parts (34a), while a through-hole 34d into which the rotational shaft 37 can be inserted is formed in the other divided ring part (34b).

With the three-stage cross roller bearing 2 of the above construction, three types of concentric rotation can be obtained from a single plane that is perpendicular to the bearing axis 1a.

Third Embodiment

Figure 3:
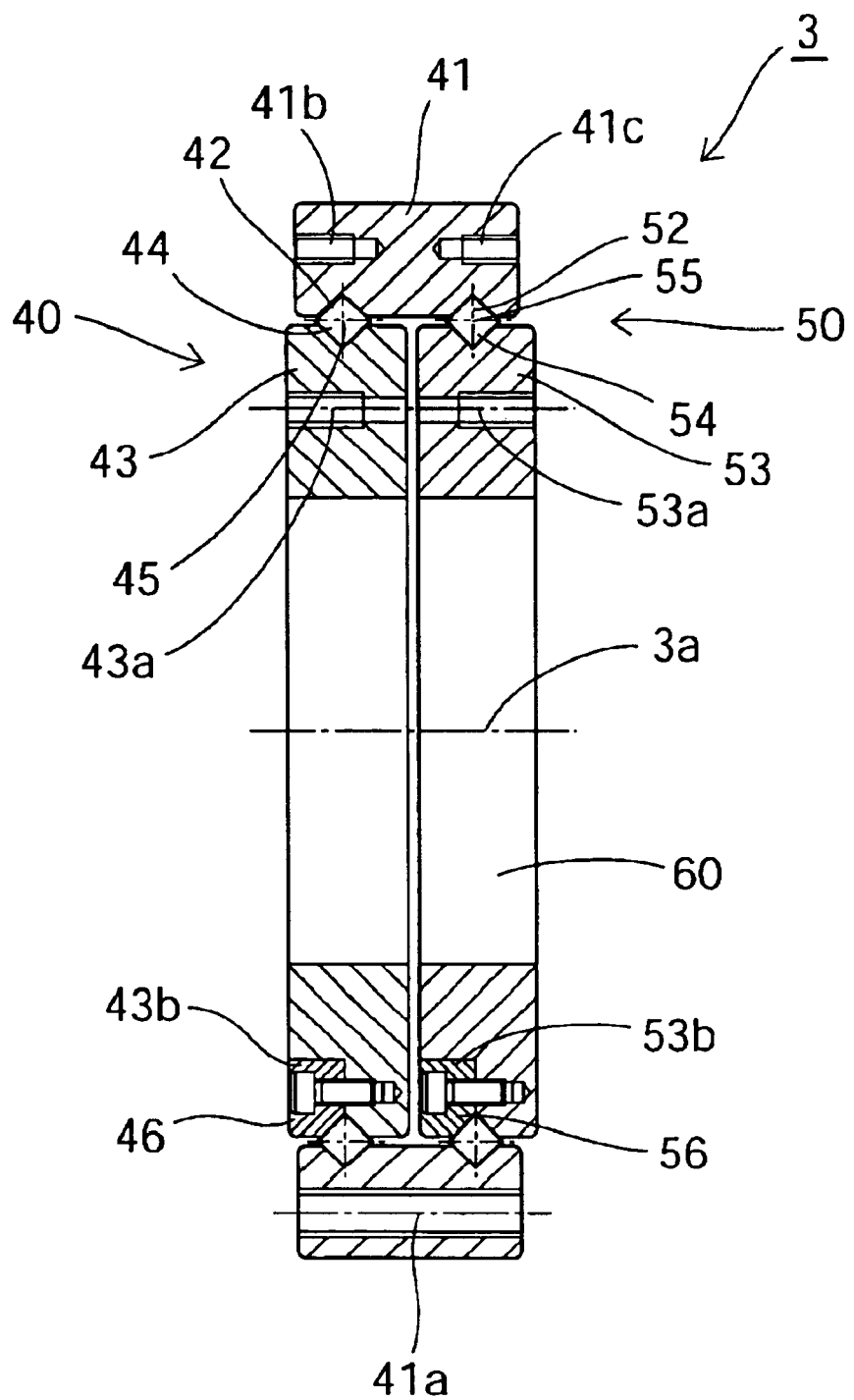
FIG. 3 is a cross-sectional view showing a two-stage cross roller bearing according to a third embodiment of the present invention.

FIG. 3 is a cross-sectional view showing a two-stage cross roller bearing according to a third embodiment of the present invention. As shown in FIG. 3, the two-stage cross roller bearing 3 according to the present embodiment includes a first cross roller bearing 40 that is disposed on one side in the direction of a bearing axis 3a and a second cross roller bearing 50 that is disposed on the other side concentrically with the first cross roller bearing 40.

The first cross roller bearing 40 includes an outer ring-side raceway groove 42 that is formed in a circular inner circumferential surface of a ring-shaped member 41, an inner ring-side raceway groove 44 that is formed in a circular outer circumferential surface of a ring-shaped inner ring 43 that is disposed on the inside of the ring-shaped member 41, and a plurality of rollers 45 that are inserted into a ring-shaped raceway formed by the outer ring-side raceway groove 42 and the inner ring-side raceway groove 44 so that the rotational axes of alternating rollers are perpendicular to one another.

The second cross roller bearing 50 has the same construction, and so includes an outer ring-side raceway groove 52 that is formed in a circular inner circumferential surface of the ring-shaped member 41 mentioned above, an inner ring-side raceway groove 54 that is formed in a circular outer circumferential surface of a ring-shaped inner ring 53 that is also disposed on the inside of the ring-shaped member 41, and a plurality of rollers 55 that are inserted into a ring-shaped raceway formed by the outer ring-side raceway groove 52 and the inner ring-side raceway groove 54 so that the rotational axes of alternating rollers are perpendicular to one another.

Here, the width of the ring-shaped member 41 is approximately equal to the combined widths of the two inner rings 43, 53. Through-holes 41a for attachment purposes and threaded holes 41b, 41c are formed in an alternating manner in the ring-shaped member 41 at intervals of certain angles around the circumference. Threaded holes 43a, 53a for attachment purposes are also formed at intervals of certain angles around the circumference of each of the inner rings 43, 53. In addition, insertion holes 43b, 53b for inserting the rollers 45, 55 into the raceway are formed in the ring-shaped end surfaces of the inner rings 43, 53, with these insertion holes 43b, 53b being plugged by plugs 46, 56.

The two-stage cross roller bearing 3 has a small, compact construction, and has an advantage in that it is easy to form an internal hollow 60 with a large inner diameter in the center of the two-stage cross roller bearing 3.

Fourth Embodiment

Figure 4:
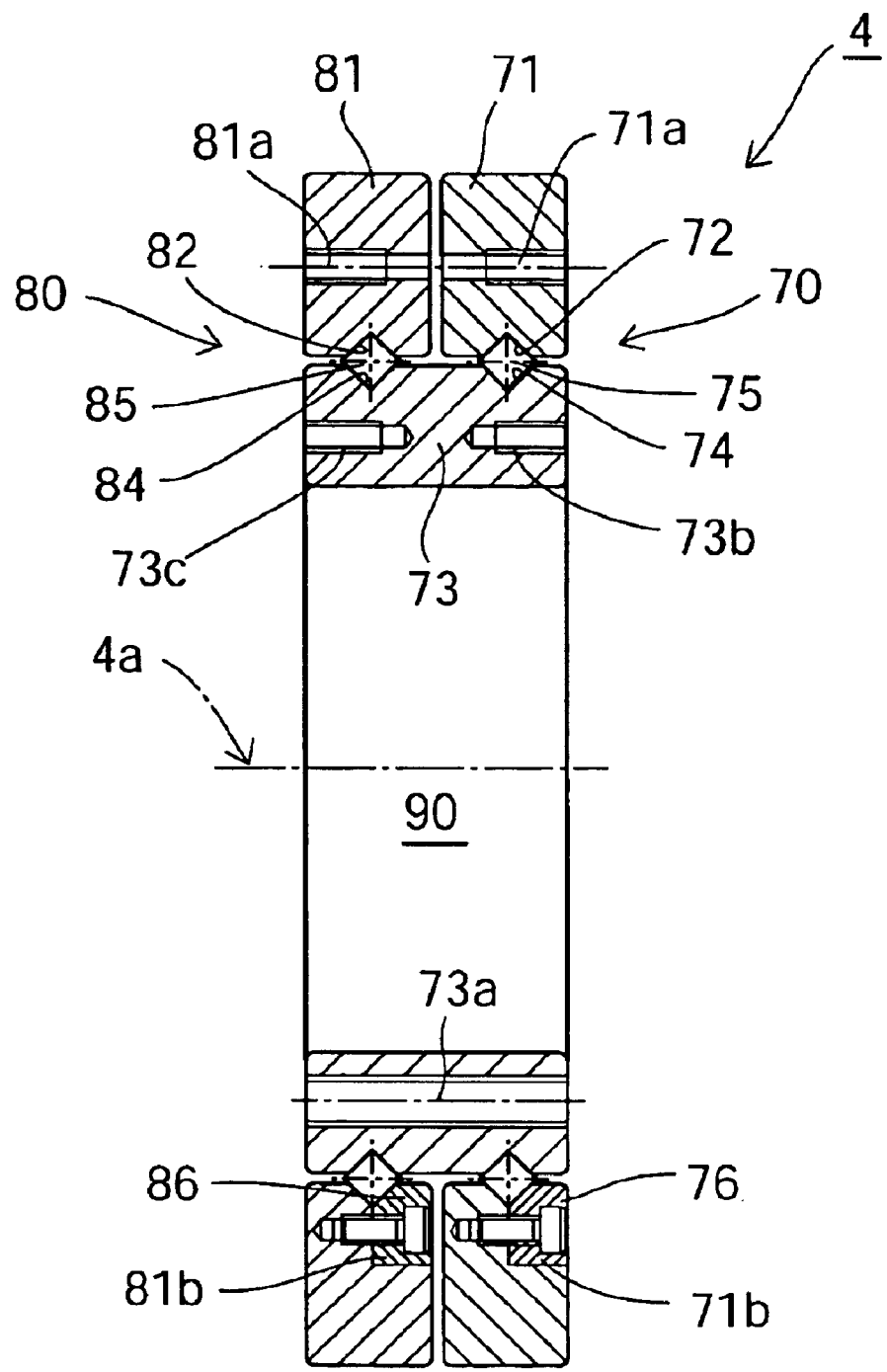
FIG. 4 is a cross-sectional view showing a two-stage cross roller bearing according to a fourth embodiment of the present invention.

FIG. 4 is a cross-sectional view showing a two-stage cross roller bearing according to a fourth embodiment of the present invention. As shown in FIG. 4, the two-stage cross roller bearing 4 according to the present embodiment includes a first cross roller bearing 70 that is disposed on one side in the direction of a bearing axis 4a and a second cross roller bearing 80 that is disposed on the other side concentrically with the first cross roller bearing 70.

The first cross roller bearing 70 includes an outer ring-side raceway groove 72 that is formed in a circular inner circumferential surface of an outer ring 71, an inner ring-side raceway groove 74 that is formed in a circular outer circumferential surface of a ring-shaped member 73 that is disposed on the inside of the outer ring 71, and a plurality of rollers 75 that are inserted into a ring-shaped raceway formed by the outer ring-side raceway groove 72 and the inner ring-side raceway groove 74 so that the rotational axes of alternating rollers are perpendicular to one another.

The second cross roller bearing 80 has the same construction, and so includes an outer ring-side raceway groove 82 that is formed in a circular inner circumferential surface of an outer ring 81 that is disposed adjacent to the outer ring 71 mentioned above, an inner ring-side raceway groove 84 that is formed in a circular outer circumferential surface of the ring-shaped member 73 mentioned above that is disposed on the inside of the outer ring 81, and a plurality of rollers 85 that are inserted into a ring-shaped raceway formed by the outer ring-side raceway groove 82 and the inner ring-side raceway groove 84 so that the rotational axes of alternating rollers are perpendicular to one another.

Here, the width of the ring-shaped member 73 is approximately equal to the combined widths of the two outer rings 71, 81. Through-holes 73a for attachment purposes and threaded holes 73b, 73c are formed in an alternating manner in the ring-shaped member 73 at intervals of certain angles around the circumference. Threaded holes 71a, 81a for attachment purposes are also formed at intervals of certain angles around the circumference of each of the outer rings 71, 81. In addition, insertion holes 71b, 81b for inserting the rollers 75, 85 into the raceway are formed in the ring-shaped end surfaces of the outer rings 71, 81, with these insertion holes 71b, 81b being plugged by plugs 76, 86.

The two-stage cross roller bearing 4 has a small, compact construction, and has an advantage in that it is easy to form an internal hollow 90 with a large inner diameter in the center of the two-stage cross roller bearing 4.

Alternative Embodiments

Though the first and second embodiments are directed to examples of multistage cross roller bearings where two or three stages are disposed concentrically, it should be obvious that the construction of the present invention may be applied in the same way to a cross roller bearing with four or more stages.

Industrial Applicability

As described above, the present invention uses a construction where a plurality of cross roller bearings are disposed concentrically in a plurality of stages along a plane which is perpendicular to the bearing axis, and is formed so that single ring-shaped members are used as the outer rings and inner rings of adjacent cross roller bearings. Accordingly, with the present invention, a multistage cross roller bearing can be produced with a small, compact construction, which in particular is extremely slim in the direction of the bearing axis.

Also, the present invention has a plurality of cross roller bearings disposed along the bearing axis and is formed with a single ring-shaped member as the inner rings or outer rings of these cross roller bearings. Accordingly, with the present invention, a multistage cross roller bearing can be realized with a small, compact construction. It is also possible to realize a multistage cross roller bearing with an internal hollow with a large internal diameter in a central part.

What is claimed is:

1. A multistage cross roller bearing, comprising a first cross roller bearing and a second cross roller bearing, wherein the second cross roller bearing is disposed inside and concentrically with the first cross roller bearing, an inner ring of the first cross roller bearing and an outer ring of the second cross roller bearing are formed of a single ring-shaped member, and an inner ring-side raceway groove of the first cross roller bearing is formed in a circular outer circumferential surface of the ring-shaped member and an outer ring-side raceway groove of the second cross roller bearing is formed in a circular inner circumferential surface of the ring-shaped member.

2. A multistage cross roller bearing according to claim 1, further comprising a third cross roller bearing that is disposed inside and concentrically with the second cross roller bearing, wherein an inner ring of the second cross roller bearing and an outer ring of the third cross roller bearing are formed of a single second ring-shaped member, and an inner ring-side raceway groove of the second cross roller bearing is formed in a circular outer circumferential surface of the second ring-shaped member and an outer ring-side raceway groove of the third cross roller bearing is formed in a circular inner circumferential surface of the second ring-shaped member.

3. A multistage cross roller bearing, comprising a first cross roller bearing having an outer ring and an inner ring and a second cross roller bearing having an outer ring and an inner ring, wherein the first cross roller bearing and the second cross roller bearing are disposed concentrically and in parallel in a direction of bearing axes of the first cross roller bearing and the second cross roller bearing, the outer rings of the first cross roller bearing and the second cross roller bearing are formed of a single ring-shaped member, and an outer ring-side raceway groove of the first cross roller bearing and an outer ring-side raceway groove of the second cross roller bearing are formed in a circular inner circumferential surface of the ring-shaped member.

4. A multistage cross roller bearing, comprising a first cross roller bearing having and outer ring and an inner ring and a second cross roller bearing having an outer ring and an inner ring, wherein the first cross roller bearing and the second cross roller bearing are disposed concentrically and in parallel in a direction of bearing axes of the first cross roller bearing and the second cross roller bearing, the inner rings of the first cross roller bearing and the second cross roller bearing are formed of a single ring-shaped member, and an inner ring-side raceway groove of the first cross roller bearing and an inner ring-side raceway groove of the second cross roller bearing are formed in a circular outer circumferential surface of the ring-shaped member.

* * * * *